(12) United States Patent
Li et al.

(10) Patent No.: US 11,452,077 B2
(45) Date of Patent: Sep. 20, 2022

(54) WIRELESS NETWORK RESOURCE ALLOCATION METHOD EMPLOYING GENERATIVE ADVERSARIAL REINFORCEMENT LEARNING

(71) Applicant: ZHEJIANG UNIVERSITY, Zhejiang (CN)

(72) Inventors: Rongpeng Li, Zhejiang (CN); Yuxiu Hua, Zhejiang (CN); Lin Ma, Zhejiang (CN); Honggang Zhang, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/708,059

(22) Filed: Mar. 30, 2022

(65) Prior Publication Data

US 2022/0232531 A1    Jul. 21, 2022

Related U.S. Application Data

(63) Continuation of application No. PCT/CN2020/100753, filed on Jul. 8, 2020.

(30) Foreign Application Priority Data

Dec. 24, 2019   (CN) .......................... 201911347500.1

(51) Int. Cl.
*H04W 72/00*   (2009.01)
*H04W 72/04*   (2009.01)

(52) U.S. Cl.
CPC .................................. *H04W 72/04* (2013.01)

(58) Field of Classification Search
CPC ............ G06N 20/00; G06N 3/08; G06N 3/02; H04W 72/04; H04W 16/10
See application file for complete search history.

(56) References Cited

U.S. PATENT DOCUMENTS

| | | | |
|---|---|---|---|
| 11,152,785 B1* | 10/2021 | Stahlfeld | H02J 3/14 |
| 2018/0314716 A1* | 11/2018 | Kim | G06T 1/0007 |
| 2019/0130253 A1* | 5/2019 | Schultz | A41D 27/00 |
| 2019/0130266 A1* | 5/2019 | Cao | G06N 7/005 |
| 2020/0311985 A1* | 10/2020 | Jeong | G06N 3/02 |
| 2020/0356810 A1* | 11/2020 | Zhong | G06N 3/084 |
| 2021/0157991 A1* | 5/2021 | Wang | G06F 40/242 |

OTHER PUBLICATIONS

WIPO, International Search Report for International Application No. PCT/CN2020/100753, dated Sep. 28, 2020.

* cited by examiner

*Primary Examiner* — Shantell L Heiber
(74) *Attorney, Agent, or Firm* — Hodgson Russ LLP (57) ABSTRACT

A wireless network resource allocating method comprises: initializing a generator network G and a discriminator network D; performing resource allocation; training weights of the generator network G and the discriminator network D; and implementing wireless network resource allocation.

20 Claims, 2 Drawing Sheets

WIRELESS NETWORK RESOURCE ALLOCATION METHOD EMPLOYING GENERATIVE ADVERSARIAL REINFORCEMENT LEARNING

CROSS-REFERENCE TO RELATED APPLICATION

This application is a continuation application of International Application No. PCT/CN2020/100753, filed on Jul. 8, 2020, which claims priority to Chinese Patent Application No. 201911347500.1, filed on Dec. 24, 2019, the entire contents of which are incorporated herein by reference.

FIELD

The present disclosure relates to the technical fields of wireless network resource allocation and reinforcement learning, and more particularly to a wireless network resource allocating method based on generative adversarial reinforcement learning.

BACKGROUND

The 5G network will support a large number of diversified business scenarios from vertical industries, such as intelligent security, high-definition video, telemedicine, smart home, autonomous driving, and augmented reality. These business scenarios usually have different communication requirements. For example, the augmented reality technology requires lower delay, and the autonomous driving technology requires the network to provide higher reliability. However, traditional mobile networks are mainly designed to serve a single mobile broadband service, which cannot adapt to the diversified 5G business scenarios in the future. If a proprietary physical network is built for each business scenario, it will inevitably lead to problems such as complex network operation and maintenance, high cost, and poor expansibility.

In order to solve the above problems, network slicing technology came into being. Specifically, in a common physical network, network and computing resources can be divided into several slices to meet different needs. This enables network tenants to arrange and configure different network slice instances according to specific requirements, so as to effectively reduce the cost and improve the flexibility of the network.

For providing services with better performance and lower cost, radio access network (RAN) slices face some challenging technical problems in realizing real-time management of resources on existing slices: (a) spectrum is a scarce resource for RAN, so it is very important to ensure spectrum efficiency (SE); and (c) the actual resource demand of each slice largely depends on the user's request mode.

Traditional dedicated resource allocation cannot solve these problems at the same time. Therefore, it is necessary to dynamically and intelligently allocate spectrum resources to different slices according to the user' service request, so as to obtain satisfactory QoE and maintain high SE.

On the other hand, reinforcement learning is a machine learning method dedicated to seeking optimal decision. A subject perceives the state information in the environment, searches for an action that can produce a maximum cumulative return (this cumulative return is also called an action value), executes this action to causes a change in state and obtain an instant return value, update the estimation of the cumulative return (action value function) to complete a learning process, enters the next round of training on learning, and repeats the loop iteration until the learning termination condition is met.

However, traditional learning methods based on action values (such as deep Q network) are difficult to cope with the interference in the environment and the uncertainty of instant return. Therefore, distribution reinforcement learning is introduced, and its main change is to estimate the action value distribution directly, rather than estimating the expectation of the action value as the traditional methods.

Generative adversarial networks was first used to generate images that can be confused with the real, and then gradually used as a data generation tool in many fields. The generative adversarial network consists of two neural networks, which are a generative network and a discrimination network. For example, for image generation, the generative network is responsible for mapping data sampled from Gaussian white noise to the space of real images to generate "false" images. Then, the "false" images and real images will be disrupted and input into the discrimination network. The discrimination network outputs a probability that the give image is a real image. The goal of the generative network is to generate an image as realistic as possible to confuse the discriminating network, while the goal of the discrimination network is to distinguish the "false" image from the real image as accurately as possible. The two neural networks are trained alternately eventually reach the Nash equilibrium. At this equilibrium point, the image generated by the generative network can no longer be distinguished from the real image by the discriminant network.

SUMMARY

Embodiments of a first aspect of the present disclosure provide a wireless network resource allocating method based on generative adversarial reinforcement learning. A generative adversarial reinforcement learning algorithm includes two neural networks, which are a generator network G and a discriminator network D. The method includes:

(1) initializing the generator network G and the discriminator network D, including:

(1.1) randomly initializing weights of the generator network G and the discriminator network D through Gaussian distribution; and setting a network $\hat{G}$ which has a same structure as that of the generator network G, and initializing a weight of the network $\hat{G}$ by copying the weight of the generator network G;

(1.2) inputting a network state s into the generator network G, outputting an $N_a \times N$-dimensional vector by the generator network G, and sequentially dividing the $N_a \times N$-dimensional vector output by the generator network G into $N_a$ N-dimensional vectors;

inputting an N-dimensional vector into the discriminator network D, the N-dimensional vector input into the discriminator network D being taken from an output of the generator network G or being obtained by calculation based on an output of the network $\hat{G}$ and an instant return; and determining by the discriminator network D that the N-dimensional vector input into the discriminator network D is taken from the output of the generator network G if an absolute value of a difference between a scalar and 0 is less than an absolute value of a difference between the scalar and 1, and determining by the discriminator network D that the N-dimensional vector input into the discriminator network D is obtained by calculation based on the output of the network $\hat{G}$ and the instant return if the absolute value of the difference between the scalar and 1 is less than the absolute value of the difference between the scalar and 0, where the scalar is output by the generator network G for representing authenticity of an input;

wherein N represents the number of samples sampled from Z(s,a), Z(s,a) represents a cumulative return distribution obtained from an action a under the network state s, the network state s represents the number of requests for each type of service in a time interval, the action a represents a magnitude of a bandwidth allocated for each type of service, $N_a$ represents the number of effective actions, and a $p^{th}$ vector in the $N_a$ N-dimensional vectors represents sampling values of an overall return distribution obtained from a $p^{th}$ action;

(2) performing resource allocation, including:

(2.1) acquiring an observed value $s_t$ of the network state s at a current time moment t by a radio resource manager; selecting an action $a_t$ using a ϵ-greedy strategy by the radio resource manager; receiving a system return value J by the radio resource manager when the action $a_t$ is executed, and observing an observed value $s_{t+1}$ of the network state s at a time moment t+1;

wherein selecting the action $a_t$ using the ϵ-greedy strategy by the radio resource manager includes:

acquiring a random number from a (0,1) uniform distribution by the radio resource manager; randomly selecting an effective action by the radio resource manager if the random number is less than ϵ;

inputting the observed value $s_t$ into the generator network G by the radio resource manager to obtain sampling values of cumulative return distributions of $N_a$ actions if the random number is greater than or equal to ϵ; calculating a mean value of the sampling values of the cumulative return distribution of each action; and selecting an action corresponding to a maximum mean value;

(2.2) setting two thresholds $c_1$ and $c_2$ and an absolute value ξ of a fixed instant return by the radio resource manager, where $c_1 > c_2$, and setting an instant return $r_t$ at the time moment t to be ξ when J>$c_1$, to be 0 when $c_2$<J<$c_1$, and to be -ξ when J<$c_2$;

(2.3) storing quadruples ($s_t$, $a_t$, $r_t$, $s_{t+1}$) by the radio resource manager in a buffer area ℬ with a size of $N_B$; deleting a quadruple earliest stored in the buffer area ℬ and storing a newest quadruple into the buffer area ℬ when the buffer area ℬ is full;

(3) every K times the resource allocation of the step (2) is performed, training the weights of the generator network G and the discriminator network D using the quadruples stored in the buffer area ℬ, including:

(3.1) training the discriminator network D first, including:

randomly selecting m quadruples ($s_t$, $a_t$, $r_t$, $s_{t+1}$) from the buffer area ℬ as training data; combining the observed values $s_t$ of the network state at the time moment t in the m quadruples into an m×$N_s$ matrix $[s_1, s_2, \ldots s_m]^T$, where $s_m$ represents an $m^{th}$ observed value $s_t$ of the network state at the time moment t; inputting the m×$N_s$ matrix $[s_1, s_2, \ldots s_m]^T$ into the generator network G to obtain sampling values of the cumulative return distribution of each action under the m observed value $s_t$ of the network state at the time moment t, and retaining sampling values corresponding to $a_1, a_2, \ldots a_m$, denoted as $G(s_1), G(s_2), \ldots G(s_m)$, where $N_s$ represents the number of service types, $G(s_m)$ represents N sampling values of a return obtained by taking the action $a_m$ under the $m^{th}$ observed value $s_t$ of the network state at the time moment t, which are recorded as sampling values of a distribution of an estimated action value;

combining m observed values $s_{t+1}$ of the network state at the time moment t+1 in the training data into an m×$N_s$ matrix $[s_1', s_2', \ldots s_m']^T$, and inputting the m×$N_s$ matrix $[s_1', s_2', \ldots s_m']^T$ into the network $\hat{G}$ to obtain sampling values of the cumulative return distribution of each action under the m observed value $s_{t+1}$ of the network state at the time moment t+1, and retaining sampling values of mean values of the maximum cumulative return generated under each observed value $s_{t+1}$ of the network state at the time moment t+1, which are denoted as $\hat{G}(s_1'), \hat{G}(s_m'), \ldots \hat{G}(s_m')$, where $s_m'$ represents a $m^{th}$ observed value $s_{t+1}$ of the network state at the time moment t+1;

making $$y_i = r_i + \gamma * \hat{G}(s_i'), i=1,2,\ldots m \quad (1),$$

where $y_i$ represents a sampling value of a distribution of a target action value, $r_i$ represents the instant return, and γ represents a discount factor;

randomly acquiring m samples from a (0,1) uniform distribution, denoted as $\varepsilon_1, \varepsilon_2, \ldots \varepsilon_m$;

making $$\hat{x}_i = \varepsilon_i * y_i + (1-\varepsilon_i) * G(s_i), i=1,2,\ldots m \quad (2),$$

where $\hat{x}_i$ represents a weighted sum of the sampling value of the distribution of the target action value and the sampling value of the distribution of the estimated action value;

wherein a loss function $L_D$ of the discriminator network D is:

$$L_D = \frac{1}{m} \sum_{i=1}^{m} \left( D(G(s_i)) - D(y_i) + \lambda \left( \left\| \nabla_{\hat{x}_i} D(\hat{x}_i) \right\|_2 - 1 \right)^2 \right) \quad (3)$$

where $D(G(s_i))$ represents an output of the discriminator network D when an input is $G(s_i)$; $D(y_i)$ represents an output of the discriminator network D when an input is $y_i$; $D(\hat{x}_i)$ represents an output of the discriminator network D when an input is $\hat{x}_i$, $\nabla_{\hat{x}_i} D(\hat{x}_i)$ represents a gradient value obtained by derivation of $D(\hat{x}_i)$ with respect to $\hat{x}_i$, and λ represents a penalty factor, and training the weight of the discriminator network D using a gradient descent algorithm to complete the training of the discriminator network D for one time;

(3.2) obtaining a newest weight of the discriminator network D to participate in the training of the generator network G, after training the discriminator network D for $n_d$ times, wherein a loss function $L_G$ of the generator network G is:

$$L_G = -\frac{1}{m} \sum_{i=1}^{m} (D(G(s_i))); \quad (4)$$

and training the weight of the generator network G using a gradient descent algorithm;

(3.3) copying the weight of the generator network G to the network $\hat{G}$ to update the weight of the network $\hat{G}$, every C times the training step (3.1) and (3.2) are performed; and (4) completing the training of the discriminator network D and the generator network G after executing the step (3) for $N_{train}$ times, wherein the radio resource manager is configured to input a current network state into the generator network G, the generator network G is configured to output the sampling values of the cumulative return distribution corresponding to each resource allocation strategy, a mean value of the sampling values of the return of each resource allocation strategy is calculated, and an action corresponding to a maximum mean value is taken as a resource allocation strategy of the radio resource manager, and (5) allocating the wireless network resource according to the resource allocation strategy corresponding to the maximum mean value determined in step (4).

Embodiments of a second aspect of the present disclosure provide a wireless network resource allocating device. The wireless network resource allocating device includes a processor; and a memory for storing instructions executable by the processor. The processor is configured to execute the instructions in the memory to implement steps of the wireless network resource allocating method as described above.

Embodiments of a third aspect of the present disclosure provide a non-transitory computer-readable storage medium having stored therein executable instructions that, when executed by a processor, causes steps of the wireless network resource allocating method as described above to be implemented.

Embodiments of a fourth aspect of the present disclosure provide a wireless network resource allocating system. The wireless network resource allocating system includes a base station; and a wireless network resource allocating device as described in the second aspect, which is in communication with the base station. The base station is configured to transmit a plurality of network resource requests to wireless network resource allocating device. The wireless network resource allocating device is configured to receive the plurality of network resource requests from the base station, execute the wireless network resource allocating method as described in the first aspect according to the plurality of network resource requests to generate a resource allocation strategy, and transmit the resource allocation strategy to the base station. The base station is further configured to receive the resource allocation strategy from the wireless network resource allocating device, divide the network resource into a plurality of network slices according to the resource allocation strategy, and allocate the plurality of network slices.

BRIEF DESCRIPTION OF THE DRAWINGS

In order to explain embodiments of the present disclosure or technical solutions in the related art more clearly, drawings to be used in the description of embodiments of the present disclosure will be briefly discussed. Clearly, the drawings described below are only some embodiments of the present disclosure, other drawings may also be obtained by those skilled in the art according to these drawings without creative labor.

DETAILED DESCRIPTION

The technical solutions as described in embodiments of the present disclosure will be described clearly and completely below with reference to the accompanying drawings. It will be understood that, the embodiments described herein are merely a part of embodiments of the present disclosure, rather than all embodiments. All other embodiments obtainable by those skilled in the art based on the embodiments described herein without creative work belong to the protection scope of the present disclosure.

An object of embodiments of the present disclosure is to provide a wireless network resource allocating method based on generative adversarial reinforcement learning, which is more efficient and flexible than a traditional dedicated resource allocation method, and is able to reduce negative impacts caused by interference factors in the communication environment and the uncertainty of instant return as compared with other reinforcement learning-based methods. Therefore, the wireless network resource allocation using a generative adversarial reinforcement learning algorithm is able to greatly improve the performance of wireless network.

Embodiments of a first aspect of the present disclosure provide a wireless network resource allocating method based on generative adversarial reinforcement learning. A generative adversarial reinforcement learning algorithm includes two neural networks, which are a generator network G and a discriminator network D. The method includes:

(1) initializing the generator network G and the discriminator network D, including:

(1.1) randomly initializing weights of the generator network G and the discriminator network D through Gaussian distribution; and setting a network $\hat{G}$ which has a same structure as that of the generator network G, and initializing a weight of the network $\hat{G}$ by copying the weight of the generator network G;

(1.2) inputting a network state s into the generator network G, outputting an $N_a \times N$-dimensional vector by the generator network G, and sequentially dividing the $N_a \times N$-dimensional vector output by the generator network G into $N_a$ N-dimensional vectors;

inputting an N-dimensional vector into the discriminator network D, the N-dimensional vector input into the discriminator network D being taken from an output of the generator network G or being obtained by calculation based on an output of the network $\hat{G}$ and an instant return; and determining by the discriminator network D that the N-dimensional vector input into the discriminator network D is taken from the output of the generator network G if an absolute value of a difference between a scalar and 0 is less than an absolute value of a difference between the scalar and 1, and determining by the discriminator network D that the N-dimensional vector input into the discriminator network D is obtained by calculation based on the output of the network $\hat{G}$ and the instant return if the absolute value of the difference between the scalar and 1 is less than the absolute value of the difference between the scalar and 0, where the scalar is output by the generator network G for representing authenticity of an input;

wherein N represents the number of samples sampled from Z(s,a), Z(s,a) represents a cumulative return distribution obtained from an action a under the network state s, the network state s represents the number of requests for each type of service in a time interval, the action a represents a magnitude of a bandwidth allocated for each type of service, $N_a$ represents the number of effective actions, and a $p^{th}$ vector in the $N_a$ N-dimensional vectors represents sampling values of an overall return distribution obtained from a $p^{th}$ action;

(2) performing resource allocation, including:

(2.1) acquiring an observed value $s_t$ of the network state s at a current time moment t by a radio resource manager; selecting an action $a_t$ using a $\epsilon$-greedy strategy by the radio resource manager; receiving a system return value J by the radio resource manager when the action $a_t$ is executed, and observing an observed value $s_{t+1}$ of the network state s at a time moment t+1;

wherein selecting the action $a_t$ using the $\epsilon$-greedy strategy by the radio resource manager includes:

acquiring a random number from a (0,1) uniform distribution by the radio resource manager;

randomly selecting an effective action by the radio resource manager if the random number is less than $\epsilon$;

inputting the observed value $s_t$ into the generator network G by the radio resource manager to obtain sampling values of cumulative return distributions of $N_a$ actions if the random number is greater than or equal to $\epsilon$; calculating a mean value of the sampling values of the cumulative return distribution of each action; and selecting an action corresponding to a maximum mean value;

(2.2) setting two thresholds $c_1$ and $c_2$ and an absolute value $\xi$ of a fixed instant return by the radio resource manager, where $c_1 > c_2$, and setting an instant return $r_t$ at the time moment t to be $\xi$ when $J > c_1$, to be 0 when $c_2 < J < c_1$, and to be $-\xi$ when $J < c_2$;

(2.3) storing quadruples $(s_t, a_t, r_t, s_{t+1})$ by the radio resource manager in a buffer area $\mathcal{B}$ with a size of $N_B$; deleting a quadruple earliest stored in the buffer area $\mathcal{B}$ and storing a newest quadruple into the buffer area $\mathcal{B}$ when the buffer area $\mathcal{B}$ is full;

(3) every K times the resource allocation of the step (2) is performed, training the weights of the generator network G and the discriminator network D using the quadruples stored in the buffer area $\mathcal{B}$, including:

(3.1) training the discriminator network D first, including:

randomly selecting m quadruples $(s_t, a_t, r_t, s_{t+1})$ from the buffer area $\mathcal{B}$ as training data;

combining the observed values $s_t$ of the network state at the time moment t in the m quadruples into an $m \times N_s$ matrix $[s_1, s_2, \ldots s_m]^T$, where $s_m$ represents an $m^{th}$ observed value $s_t$ of the network state at the time moment t; inputting the $m \times N_s$ matrix $[s_1, s_2, \ldots s_m]^T$ into the generator network G to obtain sampling values of the cumulative return distribution of each action under the m observed value $s_t$ of the network state at the time moment t, and retaining sampling values corresponding to $a_1, a_2, \ldots a_m$, denoted as $G(s_1)$, $G(s_2), \ldots G(s_m)$, where $N_s$ represents the number of service types, $G(s_m)$ represents N sampling values of a return obtained by taking the action $a_m$ under the $m^{th}$ observed value $s_t$ of the network state at the time moment t, which are recorded as sampling values of a distribution of an estimated action value;

combining m observed values $s_{t+1}$ of the network state at the time moment t+1 in the training data into an $m \times N_s$ matrix $[s_1', s_2', \ldots s_m']^T$, and inputting the $m \times N_s$ matrix $[s_1', s_2', \ldots s_m']^T$ into the network $\hat{G}$ to obtain sampling values of the cumulative return distribution of each action under the m observed value $s_{t+1}$ of the network state at the time moment t+1, and retaining sampling values of mean values of the maximum cumulative return generated under each observed value $s_{t+1}$ of the network state at the time moment t+1, which are denoted as $\hat{G}(s_1'), \hat{G}(s_2'), \ldots (s_m')$, where $s_m'$ represents a $m^{th}$ observed value $s_{t+1}$ of the network state at the time moment t+1;

making $$y_i = r_i + \gamma * \hat{G}(s_i'), i=1,2,\ldots m \qquad (1),$$

where $y_i$ represents a sampling value of a distribution of a target action value, $r_i$ represents the instant return, and $\gamma$ represents a discount factor;

randomly acquiring m samples from a (0,1) uniform distribution, denoted as $\epsilon_1, \epsilon_2, \ldots \epsilon_m$;

making $$\hat{x}_i = \epsilon_i * y_i + (1-\epsilon_i) * G(s_i), i=1,2,\ldots m \qquad (2),$$

where $\hat{x}_i$ represents a weighted sum of the sampling value of the distribution of the target action value and the sampling value of the distribution of the estimated action value;

wherein a loss function $L_D$ of the discriminator network D is:

$$L_D = \frac{1}{m}\sum_{i=1}^{m}\left(D(G(s_i)) - D(y_i) + \lambda\left(\left\|\nabla_{\hat{x}_i} D(\hat{x}_i)\right\|_2 - 1\right)^2\right) \qquad (3)$$

where $D(G(s))$ represents an output of the discriminator network D when an input is $G(s_i)$; $D(y_i)$ represents an output of the discriminator network D when an input is $y_i$; $D(\hat{x}_i)$ represents an output of the discriminator network D when an input is $\hat{x}_i$, $\nabla_{\hat{x}_i} D(\hat{x}_i)$ represents a gradient value obtained by derivation of $D(\hat{x}_i)$ with respect to $\hat{x}_i$, and represents a penalty factor, and training the weight of the discriminator network D using a gradient descent algorithm to complete the training of the discriminator network D for one time;

(3.2) obtaining a newest weight of the discriminator network D to participate in the training of the generator network G, after training the discriminator network D for $n_d$ times, wherein a loss function $L_G$ of the generator network G is:

$$L_G = -\frac{1}{m}\sum_{i=1}^{m}(D(G(s_i))); \qquad (4)$$

and training the weight of the generator network G using a gradient descent algorithm;

(3.3) copying the weight of the generator network G to the network $\hat{G}$ to update the weight of the network $\hat{G}$, every C times the training step (3.1) and (3.2) are performed; and (4) completing the training of the discriminator network D and the generator network G after executing the step (3) for $N_{train}$ times, wherein the radio resource manager is configured to input a current network state into the generator network G, the generator network G is configured to output the sampling values of the cumulative return distribution corresponding to each resource allocation strategy, a mean value of the sampling values of the return of each resource allocation strategy is calculated, and an action corresponding to a maximum mean value is taken as a resource allocation strategy of the radio resource manager; and (5) allocating the wireless network resource according to the resource allocation strategy corresponding to the maximum mean value determined in step (4).

In some embodiments of the present disclosure, the discount factor γ is in the range of 0.75 to 0.9.

In some embodiments of the present disclosure, N is in the range of 30 to 55.

In some embodiments of the present disclosure, ϵ has an initial value of 0.9, and is reduced by 0.05 every 100 times the step (2) is performed and remains unchanged until ϵ reaches 0.05; and ξ is in the range of 0.8 to 1.5.

In some embodiments of the present disclosure, the magnitude $N_B$ of the buffer area $\mathcal{B}$ is in the range of 3000 to 10000.

In some embodiments of the present disclosure, $n_d$ is in the range of 1 to 10; and the number m of the quadruplets is 32 or 64.

In some embodiments of the present disclosure, the penalty factor λ is 10, 20 or 30.

In some embodiments of the present disclosure, the gradient descent algorithm for training both the generator network G and the discriminator network D is Adam with a learning rate of 0.001.

In some embodiments of the present disclosure, K is in the range of 10 to 50.

In some embodiments of the present disclosure, $N_{train}$ is in the range of 2000 to 3000.

The embodiments of the present disclosure have the following technical effects.

(1) The distribution of action values is estimated using the reinforcement learning method. As compared with estimating the expectation of the action value in traditional methods, the learning method proposed by the present disclosure has better stability and adaptability, which enables the radio resource manager to learn an optimal resource allocation strategy in a system environment with noise interference and randomness.

(2) Embodiments of the present disclosure adopts a method which alternately trains two neural networks (i.e., the generator network and the discriminator network) to learn the distribution of action values, which does not need any prior assumption of the action value distribution, as compared with a traditional method which learns the distribution of random variables.

(3) The resource allocation strategy obtained by embodiments of the present disclosure can obtain a higher system return value, i.e. higher spectrum efficiency and better user experience, as compared with a resource allocating method based on traffic prediction results and an average resource allocating method.

In order to make the above objects, characteristics and advantages of the present disclosure more apparent and understandable, the present disclosure will be described in detail below with reference to drawings and specific implementations.

Figure 1:
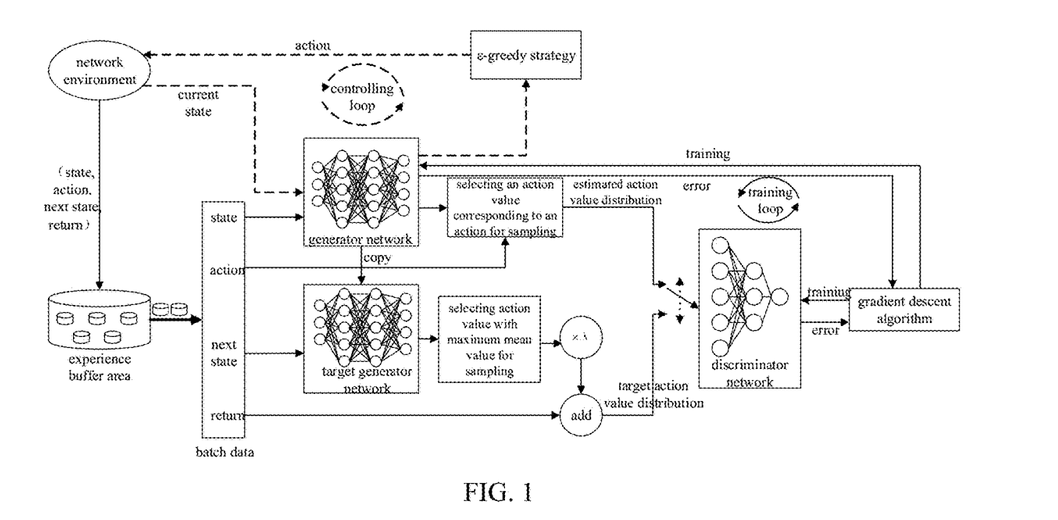
FIG. 1 is a schematic flowchart of a wireless network resource allocating method based on generative adversarial reinforcement learning according to an embodiment of the present disclosure.

FIG. 1 is a flowchart of a wireless network resource allocating method based on generative adversarial reinforcement learning according to embodiments of the present disclosure. As illustrated in FIG. 1, the wireless network resource allocating method includes the following steps.

(1) A generator network G and a discriminator network D are initialized, which including the following steps.

(1.1) A generative adversarial reinforcement learning algorithm includes two neural networks, which are the generator network G and the discriminator network D. Weights of the generator network G and the discriminator network D are randomly initialized through Gaussian distribution. In order to enhance the convergence of the algorithm, a network $\hat{G}$ is set, which has a structure exactly the same as that of the generator network G, and a weight of the network $\hat{G}$ is initialized by copying the weight of the generator network G.

(1.2) A network state s in the reinforcement learning is input into the generator network G, an $N_a \times N$-dimensional vector is output by the generator network G, and the $N_a \times N$-dimensional vector output by the generator network G is sequentially divided into $N_a$ N-dimensional vectors, where N is in the range of 30 to 50. If N is too small, an action value distribution cannot be fully described, and if N is too large, the amount of calculation will be increased. An N-dimensional vector is input into the discriminator network D, the N-dimensional vector is taken from an output of the generator network G or is obtained by calculation based on an output of the network $\hat{G}$ and an instant return r, and the discriminator network D outputs a scalar, which is calculated through a fully connected neural network. The generator network G outputs a scalar for representing authenticity of an input.

If an absolute value of a difference between the scalar output by the generator network G and 0 is less than an absolute value of a difference between the scalar output by the generator network G and 1, the discriminator network D determines that the N-dimensional vector input into the discriminator network D is taken from the output of the generator network G, and if the absolute value of the difference between the scalar output by the generator network G and 1 is less than the absolute value of the difference between the scalar output by the generator network G and 0, the discriminator network D determines that the N-dimensional vector input into the discriminator network D is obtained by calculation based on the output of the network $\hat{G}$ and the instant return.

N represents the number of samples sampled from Z(s,a), Z(s,a) represents a cumulative return distribution obtained from an action a under the network state s, the network state s represents the number of requests for each type of service in a time interval, the action a represents a magnitude of a bandwidth allocated for each type of service, $N_a$ represents the number of effective actions, and a $p^{th}$ vector in the $N_a$ N-dimensional vectors represents sampling values of an overall return distribution obtained from a $p^{th}$ action.

(2) Resource allocation is performed, which includes the following steps.

(2.1) A radio resource manager acquires an observed value $s_t$ of the network state s at a current time moment t. The radio resource manager selects an action $a_t$ using a ϵ-greedy strategy. When the action $a_t$ is executed, the radio resource manager receives a system return value J, and observes an observed value $s_{t+1}$ of the network state s at a time moment t+1.

Specifically, selecting the action $a_t$ using the ϵ-greedy strategy by the radio resource manager includes the following operations. The radio resource manager acquires a random number from a (0,1) uniform distribution. If the random number is less than ϵ, the radio resource manager randomly selects an effective action. If the random number is greater than or equal to ϵ, the radio resource manager inputs the observed value $s_t$ into the generator network G to obtain sampling values of an overall return distribution of $N_a$ actions, a mean value of the sampling values of the cumulative return distribution of each action is calculated, and an action corresponding to a maximum mean value is selected. The action taken by the radio resource manager at this step is denoted as $a_t$. When the action $a_t$ is executed, the radio resource manager receives the system return value J, and observes the observed value $s_{t+1}$ of the network state s at the time moment t+1. Herein, ε has an initial value of 0.9, and is reduced by 0.05 every 100 times the step (2) is performed and remains unchanged until ε reaches 0.05.

(2.2) The radio resource manager sets two thresholds $c_1$ and $c_2$ ($c_1 > c_2$) and an absolute value ξ of a fixed instant return, and stipulates that an instant return $r_t$ at the time moment t to be ξ when $J > c_1$, to be 0 when $c_2 < J < c_1$, and to be −ξ when $J < c_2$, where ξ is in the range of 0.8 to 1.5. If ξ is too small, the convergence rate will be slowed down, and if ξ is too large, the stability of the training process will be destroyed.

(2.3) The radio resource manager stores quadruples ($s_t$, $a_t$, $r_t$, $s_{t+1}$) into a buffer area $\mathcal{B}$ with a size of $N_B$, and $N_B$ is in the range of 3000 to 10000. If $N_B$ is too small, the stability of the training process will be destroyed, and if $N_B$ is too large, the amount of calculation will be increased. If the buffer area $\mathcal{B}$ is full, a quadruple earliest stored in the buffer area $\mathcal{B}$ will be deleted, and then a newest quadruple will be stored into the buffer area $\mathcal{B}$.

(3) Every K times the resource allocation of the step (2) is performed, the weights of the generator network G and the discriminator network D will be trained using the quadruples stored in the buffer area $\mathcal{B}$. K is in the range of 10 to 50. If K is too small, the amount of calculation will be increased, and if K is too large, the convergence rate will be slowed down.

(3.1) The discriminator network D is trained first, which specifically includes the following steps.

From the buffer area $\mathcal{B}$, m quadruples ($s_t$, $a_t$, $r_t$, $s_{t+1}$) are randomly selected as training data, where m is 32 or 64.

The m observed values $s_t$ of the network state at the time moment t in the training data are combined into an $m \times N_s$ matrix $[s_1, s_2, \ldots s_m]^T$, where $s_m$ represents an $m^{th}$ observed value $s_t$ of the network state at the time moment t. The $m \times N_s$ matrix $[s_1, s_2, \ldots s_m]^T$ is input into the generator network G to obtain sampling values of the cumulative return distribution generated by each action under the m observed value $s_t$ of the network state at the time moment t, and sampling values corresponding to $a_1, a_2, \ldots a_m$ are retained, which are denoted as $G(s_1), G(s_2), \ldots G(s_m)$. $N_s$ represents the number of service types, $G(s_m)$ represents N sampling values of a return obtained by taking the action $a_m$ under the $m^{th}$ observed value $s_t$ of the network state at the time moment t, which are recorded as sampling values of a distribution of an estimated action value.

The m observed values $s_{t+1}$ of the network state at the time moment t+1 in the training data are combined into an $m \times N_s$ matrix $[s_1', s_2', \ldots s_m']^T$. The $m \times N_s$ matrix $[s_1', s_2', \ldots s_m']^T$ is input into the network t to obtain sampling values of the cumulative return distribution of each action under the m observed value $s_{t+1}$ of the network state at the time moment t+1, and sampling values of maximum overall return average values generated under each observed value $s_{t+1}$ of the network state at the time moment t+1 are retained, which are denoted as $\hat{G}(s_1'), \hat{G}(s_2'), \ldots \hat{G}(s_m')$, where $s_m'$ represents a $m^{th}$ observed value $s_{t+1}$ of the network state at the time moment t+1.

Making $$y_i = r_i + \gamma * \hat{G}(s), i=1,2,\ldots m \qquad (1),$$

where $y_i$ represents a sampling value of a distribution of a target action value, $r_i$ represents the instant return, and γ represents a discount factor. γ is in the range of 0.75 to 0.9, and if γ is too small or too large, the wireless resource manager will not be able to take an optimal action under any network state.

From a (0,1) uniform distribution, m samples are randomly acquired, which are denoted as $\varepsilon_1, \varepsilon_2, \ldots \varepsilon_m$. Making $$\hat{x}_i = \varepsilon_i * y_i + (1-\varepsilon_i) * G(s_i), i=1,2,\ldots m \qquad (2),$$

where $\hat{x}_i$ represents a weighted sum of the sampling value of the distribution of the target action value and the sampling value of the distribution of the estimated action value, and i represents an $i^{th}$ sample in the m samples.

A loss function $L_D$ of the discriminator network D is:

$$L_D = \frac{1}{m}\sum_{i=1}^{m} \left( D(G(s_i)) - D(y_i) + \lambda \left( \left\| \nabla_{\hat{x}_i} D(\hat{x}_i) \right\|_2 - 1 \right)^2 \right), \qquad (3)$$

where $D(G(s_i))$ represents an output of the discriminator network D when an input is $G(s_i)$; $D(y_i)$ represents an output of the discriminator network D when an input is $y_i$; $D(\hat{x}_i)$ represents an output of the discriminator network D when an input is $\hat{x}_i$, $\nabla_{\hat{x}_i} D(\hat{x}_i)$ represents a gradient value obtained by derivation of $D(\hat{x}_i)$ with respect to $\hat{x}_i$, and λ represents a penalty factor. The penalty factor λ is 10, 20 or 30, if λ is too small, the effect of the penalty item will be weaken, and if λ is too large, the discriminator network D will converge prematurely, which is not conducive to the training of the generator network G. Then, the weight of the discriminator network D is trained using a gradient descent algorithm to complete the training of the discriminator network D for one time.

(3.2) After training the discriminator network D for $n_d$ times, a newest weight of the discriminator network D is acquired to participate in the training of the generator network G, and $n_d$ is in the range of 1 to 10. If $n_d$ is too large, the discriminator network D will converge prematurely, which is not conducive to the training of the generator network G.

A loss function $L_G$ of the generator network G is:

$$L_G = -\frac{1}{m}\sum_{i=1}^{m} (D(G(s_i))). \qquad (4)$$

Then, the weight of the generator network G is trained using a gradient descent algorithm.

The gradient descent algorithm for training both the generator network G and the discriminator network D is Adam with a learning rate of 0.001. If the learning rate is too small, the convergence rate will be slowed down, and if the learning rate is too large, the training process will be unstable.

(3.3) Every C times the training step (3.1) and (3.2) are performed, the weight of the generator network G is copied to the network $\hat{G}$ to update the weight of the network $\hat{G}$. Herein, C is in the range of 50 to 200, if C is too small, the training process will be unstable, and if C is too large, the convergence rate will be slowed down.

(4) After executing the step (3) for $N_{train}$ times, the training of the discriminator network D and the generator network G is completed. Herein, $N_{train}$ is in the range of 2000 to 3000. If $N_{train}$ is too small, the wireless resource manager will not be able to take an optimal action under any network state, and If $N_{train}$ is too large, the amount of calculation will be increased. The radio resource manager inputs a current network state vector into the generator network G, the generator network G outputs the sampling values of the cumulative return distribution corresponding to each resource allocation strategy, a mean value of the sampling values of the return of each resource allocation strategy is calculated, and an action corresponding to a maximum mean value is taken as a resource allocation strategy of the radio resource manager.

(5) The wireless network resource is allocated according to the resource allocation strategy corresponding to the maximum mean value determined in step (4).

On a host configured as shown in Table 1, a simulation environment is written in Python language, and tests are made for three different types of services (i.e., a calling service, a video service and an ultra-reliable low delay service). The resource to be allocated is a wireless bandwidth with a total bandwidth of 10 M. The allocated granularity is 1 M, so there are 36 allocation strategies in total, that is, the number of effective actions is 36. The discount factor $\gamma$ is set to be 0.9, the number N of samples sampled from the overall return distribution is 50, and $\epsilon$ has an initial value of 0.9, and is reduced by 0.05 every 100 times the algorithm is performed and remains unchanged until $\epsilon$ reaches 0.05. The magnitude $N_B$ of the buffer area $\mathcal{B}$ is 10000. The generator network G has an input layer, a first hidden layer, a second hidden layer and an output layer, the input layer has 3 neurons, the first hidden layer has 512 neurons, the second hidden layer has 512 neurons, and the output layer has 1800 neurons. The discriminator network D has an input layer, a first hidden layer, a second hidden layer and an output layer, the input layer has 50 neurons, the first hidden layer has 256 neurons, the second hidden layer has 256 neurons, and the output layer has 1 neuron. The penalty factor $\lambda$ in the loss function of the discriminator network D is 30. The gradient descent algorithm for training both the generator network G and the discriminator network D is Adam with a learning rate of 0.001. Other parameters are that $\xi=1.5$, K=50, $n_d=5$, m=64, and C=200.

TABLE 1

Parameters of a system test platform

| | |
|---|---|
| processor | Intel i7-6900K 3.2 GHZ |
| memory | 16G DDR |
| graphics card | NVIDIA Titan X |
| software platform | Pytorch 1.0 |

Figure 2:
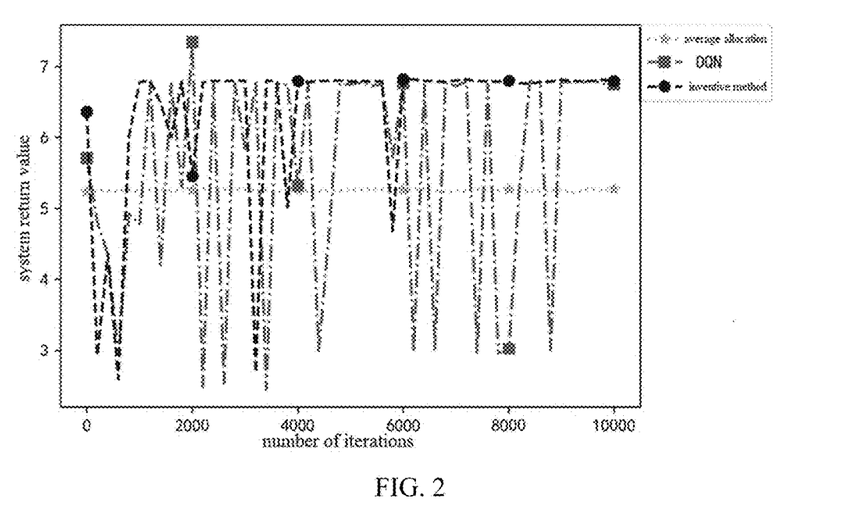
FIG. 2 is a schematic graph showing changes of system return values obtained by a method according to an embodiment of the present disclosure, a DQN-based resource allocation algorithm and an average allocation method in wireless resource allocation when a packet size of an ultra-reliable low-latency service is evenly taken from {6.4, 12.8, 19.2, 25.6, 32} Kbyte.
Figure 3:
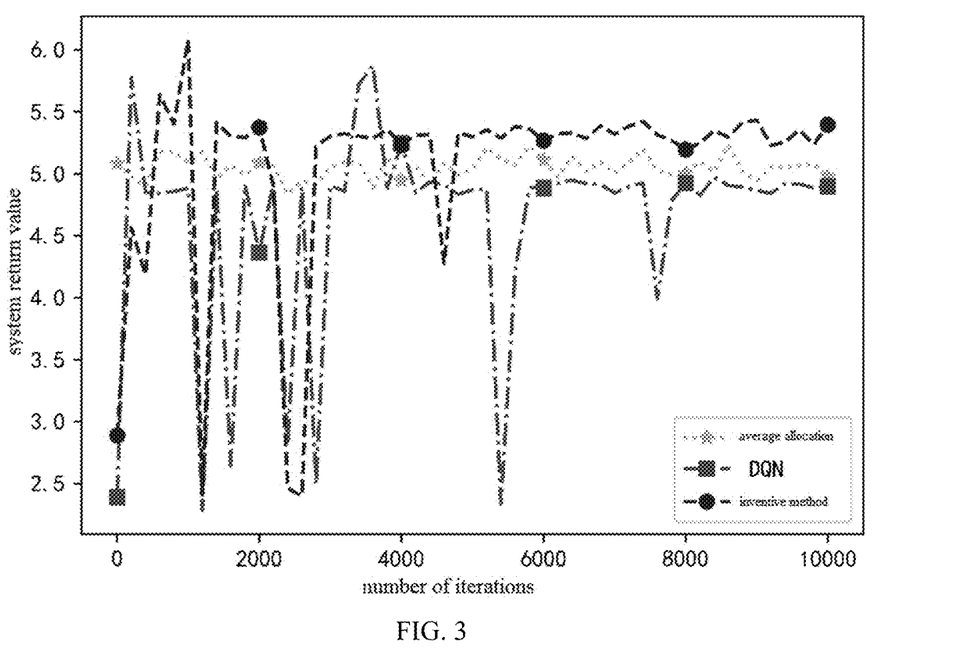
FIG. 3 is a schematic graph showing changes of system return values obtained by a method according to an embodiment of the present disclosure, a DQN-based resource allocation algorithm and an average allocation method in wireless resource allocation when a packet size of an ultra-reliable low-latency service is evenly taken from {0.3, 0.4, 0.5, 0.6, 0.7} Mbyte.

The method according to embodiments of the present disclosure is compared with the DQN-based resource allocation algorithm and the average allocation method. FIG. 2 shows the changes of system return values obtained by the three methods in wireless resource allocation. As can be seen from FIG. 2, with the number of iterations increases, the method proposed in the present disclosure has a better stability. It should be noted that in this simulation, the packet size of the ultra-reliable low-latency service is evenly taken from {6.4, 12.8, 19.2, 25.6, 32} KByte. Since the packet is very small, the performance requirements of ultra-reliable low-delay service are easily met, so both the method proposed in the present disclosure and the DQN-based resource allocation algorithm can achieve a high system return value. FIG. 3 shows a situation when the packet size of the ultra-reliable low-latency service is evenly taken from {0.3, 0.4, 0.5, 0.6, 0.7} MByte. As can be seen from FIG. 3, as the packet of the ultra-reliable low-latency service is very large, the system return values obtained by the three methods are all reduced, but the system return value obtained by the method proposed in the present disclosure is higher than that obtained by the DQN-based resource allocation algorithm.

In another example, the discount factor $\gamma$ is set to be 0.75, the number N of samples sampled from the overall return distribution is 30, and $\epsilon$ has an initial value of 0.9, and is reduced by 0.05 every 100 times the algorithm is performed and remains unchanged until $\epsilon$ reaches 0.05. The magnitude $N_B$ of the buffer area $\mathcal{B}$ is 3000. The generator network G has an input layer, a first hidden layer, a second hidden layer and an output layer, the input layer has 3 neurons, the first hidden layer has 512 neurons, the second hidden layer has 512 neurons, and the output layer has 1080 neurons. The discriminator network D has an input layer, a first hidden layer, a second hidden layer and an output layer, the input layer has 50 neurons, the first hidden layer has 256 neurons, the second hidden layer has 256 neurons, and the output layer has 1 neuron. The penalty factor $\lambda$ in the loss function of the discriminator network D is 10. The gradient descent algorithm for training both the generator network G and the discriminator network D is Adam with a learning rate of 0.001. Other parameters are that $\xi=0.8$, K=10, $n_d=1$, m=32, and C=50. Through the above parameter settings, the wireless network resource allocating method proposed in the present disclosure still has better stability and can achieve a higher system return value.

Embodiments of a second aspect of the present disclosure provide a wireless network resource allocating device. The wireless network resource allocating device includes a processor; and a memory for storing instructions executable by the processor. The processor is configured to execute the instructions in the memory to implement steps of the wireless network resource allocating method as described above.

Embodiments of a third aspect of the present disclosure provide a non-transitory computer-readable storage medium having stored therein executable instructions that, when executed by a processor, causes steps of the wireless network resource allocating method as described above to be implemented.

Embodiments of a fourth aspect of the present disclosure provide a wireless network resource allocating system. The wireless network resource allocating system includes a base station; and a wireless network resource allocating device as described in the second aspect, which is in communication with the base station. The base station is configured to transmit a plurality of network resource requests to wireless network resource allocating device. The wireless network resource allocating device is configured to receive the plurality of network resource requests from the base station, execute the wireless network resource allocating method as described in the first aspect according to the plurality of network resource requests to generate a resource allocation strategy, and transmit the resource allocation strategy to the base station. The base station is further configured to receive the resource allocation strategy from the wireless network resource allocating device, divide the network resource into a plurality of network slices according to the resource allocation strategy, and allocate the plurality of network slices.

Specifically, a plurality of applications transmit a plurality of network resource requests to the base station. The base station receives the plurality of network resource requests from the plurality of applications, and transmits the plurality of network resource requests to the wireless network resource allocating device. The wireless network resource allocating device receives the plurality of network resource requests from the base station, and executes the wireless network resource allocating method as described above according to the plurality of network resource requests to generate the resource allocation strategy, and transmit the resource allocation strategy to the base station. The base station receives the resource allocation strategy from the wireless network resource allocating device, divides the network resource into a plurality of network slices according to the resource allocation strategy, and allocates the plurality of network slices to the plurality of applications, respectively.

Figure 4:
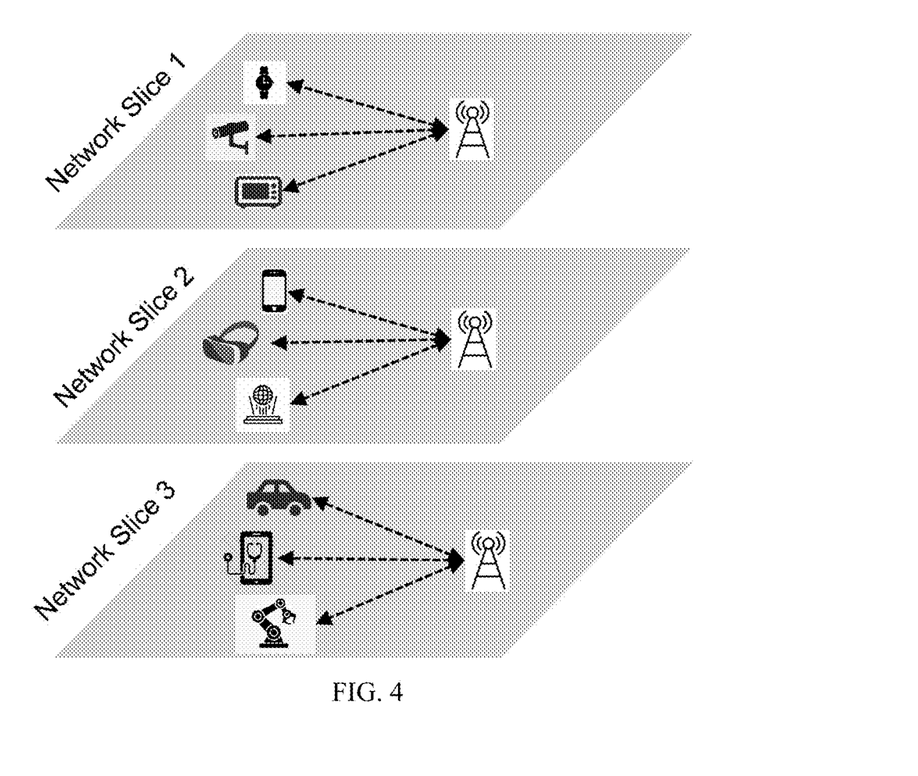
FIG. 4 is a schematic diagram showing wireless network resource allocation among different applications, according to an embodiment of the present disclosure.

For example, as shown in FIG. 4, the base station receives three kinds of network resource requests from three kinds of application scenarios. After interactions with the wireless network resource allocating device as described in detail above, the base station receives a resource allocation strategy determined by the wireless network resource allocating device, divides the network resource into three kinds of network slices (such as network slice 1, network slice 2 and network slice 3 as shown in FIG. 4) according to the resource allocation strategy, and allocates the three kinds of network slices to the three kinds of application scenarios, respectively. For example, the base station allocates the network slice 1 to intelligent security or smart home, allocates the network slice 2 to high-definition video or augmented reality, and allocates the network slice 3 to autonomous driving or telemedicine.

The above various embodiments of the systems and technologies described herein can be implemented in a digital electronic circuit system, an integrated circuit system, a field programmable gate array (FPGA), an application specific integrated circuit (ASIC), an application-specific standard product (ASSP), a system of a system on chip (SOC), a load programmable logic device (CPLD), a computer hardware, firmware, software, and/or a combination thereof. These various embodiments may include: being implemented in one or more computer programs, which may be executed and/or interpreted on a programmable system including at least one programmable processor, the programmable processor may be a dedicated or general-purpose programmable processor that can receive data and instructions from a storage system, at least one input device and at least one output device, and transmit data and instructions to the storage system, the at least one input device and the at least one output device.

The program codes used to implement the method of the present disclosure can be written in any combination of one or more programming languages. These program codes can be provided to a processor or controller of a general-purpose computer, a special-purpose computer or other programmable data processing devices, so that when the program codes are executed by the processor or controller, the functions/operations specified in the flowcharts and/or block diagrams are implemented. The program codes can be executed entirely on a machine, partly executed on a machine, partly executed on a machine and partly executed on a remote machine as an independent software package, or entirely executed on a remote machine or a server.

In the context of the present disclosure, a machine-readable medium may be a tangible medium, which may contain or store a program for use by an instruction execution system, an apparatus or a device or for use in combination with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared or semiconductor system, an apparatus or a device or any suitable combination of the foregoing. More specific examples of the machine-readable storage medium may include electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combination of the foregoing.

In order to provide interaction with a user, the systems and technologies described here can be implemented on a computer, which has: a display apparatus for displaying information to the user (for example, a CRT (cathode ray tube) or LCD (liquid crystal display) monitor); and a keyboard and pointing apparatus (for example, a mouse or a trackball), through which the user can provide input to the computer. Other types of apparatuses can also be used to provide interaction with the user; for example, the feedback provided to the user can be any form of sensory feedback (for example, visual feedback, auditory feedback or tactile feedback); and input from the user can be received in any form (including acoustic input, voice input or tactile input).

The systems and technologies described here can be implemented in a computing system that includes back-end components (for example, as a data server), or a computing system that includes middleware components (for example, an application server), or a computing system that includes front-end components (for example, a user computer with a graphical user interface or a web browser, through which the user can interact with the embodiments of the systems and technologies described herein), or a computing system that includes any combination of such back-end components, middleware components or front-end components. The components of the system can be connected to each other through any form or medium of digital data communication (for example, a communication network). Examples of the communication network include: a local area network (LAN), a wide area network (WAN), the Internet, and a blockchain network.

The computer system may include a client and a server. The client and the server are generally far away from each other and usually interact through a communication network. The relationship between the client and the server will be generated by a computer program that runs on a corresponding computer and has a client-server relationship with each other. The server may be a cloud server, also known as a cloud computing server or a cloud host, which is a host product in a cloud computing service system to solve the defect of difficult management and weak business scalability existed in the traditional physical host and VPS service ("Virtual Private Server", or "VPS" for short). The server may also be a server of a distributed system, or a server combined with a blockchain.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

The principles and implementations of the present disclosure are described herein with reference to specific examples. The descriptions on the above embodiments are only used to help understand the method proposed in the present disclosure and its core idea. It would be appreciated by those ordinarily skilled in the art that changes can be made in the embodiments and application scopes without departing from spirit of the present disclosure. In conclusion, the contents of this specification should not be construed as limiting the present disclosure.

What is claimed is:

1. A wireless network resource allocating method based on generative adversarial reinforcement learning, wherein a generative adversarial reinforcement learning algorithm comprises two neural networks, which are a generator network G and a discriminator network D, wherein the method comprises:

(1) initializing the generator network G and the discriminator network D, comprising:

(1.1) randomly initializing weights of the generator network G and the discriminator network D through Gaussian distribution; and setting a network $\hat{G}$ which has a same structure as that of the generator network G, and initializing a weight of the network $\hat{G}$ by copying the weight of the generator network G;

(1.2) inputting a network state s into the generator network G, outputting an N×N-dimensional vector by the generator network G, and sequentially dividing the $N_a$×N-dimensional vector output by the generator network G into $N_a$ N-dimensional vectors;

inputting an N-dimensional vector into the discriminator network D, the N-dimensional vector input into the discriminator network D being taken from an output of the generator network G or being obtained by calculation based on an output of the network $\hat{G}$ and an instant return; and determining by the discriminator network D that the N-dimensional vector input into the discriminator network D is taken from the output of the generator network G if an absolute value of a difference between a scalar and 0 is less than an absolute value of a difference between the scalar and 1, and determining by the discriminator network D that the N-dimensional vector input into the discriminator network D is obtained by calculation based on the output of the network $\hat{G}$ and the instant return if the absolute value of the difference between the scalar and 1 is less than the absolute value of the difference between the scalar and 0, where the scalar is output by the generator network G for representing authenticity of an input;

wherein N represents the number of samples sampled from Z(s,a), Z(s,a) represents a cumulative return distribution obtained from an action a under the network state s, the network state s represents the number of requests for each type of service in a time interval, the action a represents a magnitude of a bandwidth allocated for each type of service, $N_a$ represents the number of effective actions, and a $p^{th}$ vector in the $N_a$ N-dimensional vectors represents sampling values of an overall return distribution obtained from a $p^{th}$ action;

(2) performing resource allocation, comprising:

(2.1) acquiring an observed value $s_t$ of the network state s at a current time moment t by a radio resource manager; selecting an action $a_t$ using a ε-greedy strategy by the radio resource manager; receiving a system return value J by the radio resource manager when the action $a_t$ is executed, and observing an observed value $s_{t+1}$ of the network state s at a time moment t+1;

wherein selecting the action $a_t$ using the ε-greedy strategy by the radio resource manager comprises:

acquiring a random number from a (0,1) uniform distribution by the radio resource manager;

randomly selecting an effective action by the radio resource manager if the random number is less than ε;

inputting the observed value $s_t$ into the generator network G by the radio resource manager to obtain sampling values of cumulative return distributions of $N_a$ actions if the random number is greater than or equal to ε; calculating a mean value of the sampling values of the cumulative return distribution of each action; and selecting an action corresponding to a maximum mean value;

(2.2) setting two thresholds $c_1$ and $c_2$ and an absolute value ξ of a fixed instant return by the radio resource manager, where $c_1 > c_2$, and setting an instant return $r_t$ at the time moment t to be ξ when $J > c_1$, to be 0 when $c_2 < J < c_1$, and to be −ξ when $J < c_2$;

(2.3) storing quadruples ($s_t$, $a_t$, $r_t$, $s_{t+1}$) by the radio resource manager in a buffer area $\mathcal{B}$ with a size of $N_B$; deleting a quadruple earliest stored in the buffer area $\mathcal{B}$ and storing a newest quadruple into the buffer area $\mathcal{B}$ when the buffer area $\mathcal{B}$ is full;

(3) every K times the resource allocation of the step (2) is performed, training the weights of the generator network G and the discriminator network D using the quadruples stored in the buffer area $\mathcal{B}$, comprising:

(3.1) training the discriminator network D first, comprising:

randomly selecting m quadruples ($s_t$, $a_t$, $r_t$, $s_{t+1}$) from the buffer area $\mathcal{B}$ as training data;

combining the observed values $s_t$ of the network state at the time moment t in the m quadruples into an m×$N_s$ matrix $[s_1, s_2, \ldots s_m]^T$, where $s_m$ represents an $m^{th}$ observed value $s_t$ of the network state at the time moment t; inputting the m×$N_s$ matrix $[s_1, s_2, \ldots s_m]^T$ into the generator network $\hat{G}$ to obtain sampling values of the cumulative return distribution of each action under the m observed value $s_t$ of the network state at the time moment t, and retaining sampling values corresponding to $a_1, a_2, \ldots a_m$, denoted as $G(s_1)$, $G(s_2), \ldots G(s_m)$, where $N_s$ represents the number of service types, $G(s_m)$ represents N sampling values of a return obtained by taking the action $a_m$ under the $m^{th}$ observed value $s_t$ of the network state at the time moment t, which are recorded as sampling values of a distribution of an estimated action value;

combining m observed values $s_{t+1}$ of the network state at the time moment t+1 in the training data into an m×$N_s$ matrix $[s_1', s_2', \ldots s_m']^T$, and inputting the m×$N_s$ matrix $[s_1', s_2', \ldots s_m']^T$ into the network $\hat{G}$ to obtain sampling values of the cumulative return distribution of each action under the m observed value $s_{t+1}$ of the network state at the time moment t+1, and retaining sampling values of mean values of the maximum cumulative return generated under each observed value $s_{t+1}$ of the network state at the time moment t+1, which are denoted as $\hat{G}(s_1')$, $\hat{G}(s_2')$, ... $\hat{G}(s_m')$, where $s_m'$ represents a $m^{th}$ observed value $s_{t+1}$ of the network state at the time moment t+1;

making $$y_i = r_i + \gamma * \hat{G}(s_i'), i=1,2,\ldots m \quad (1),$$

where $y_i$ represents a sampling value of a distribution of a target action value, $r_i$ represents the instant return, and $\gamma$ represents a discount factor;

randomly acquiring m samples from a (0,1) uniform distribution, denoted as $\varepsilon_1, \varepsilon_2, \ldots \varepsilon_m$;

making $$\hat{x}_i = \varepsilon_i * y_i + (1-\varepsilon_i) * G(s_i), i=1,2,\ldots m \quad (2),$$

where $\hat{x}_i$ represents a weighted sum of the sampling value of the distribution of the target action value and the sampling value of the distribution of the estimated action value;

wherein a loss function $L_D$ of the discriminator network D is:

$$L_D = \frac{1}{m}\sum_{i=1}^{m}\left(D(G(s_i)) - D(y_i) + \lambda(\|\nabla_{\hat{x}_i} D(\hat{x}_i)\|_2 - 1)^2\right) \quad (3)$$

where $D(G(s))$ represents an output of the discriminator network D when an input is $G(s_i)$; $D(y_i)$ represents an output of the discriminator network D when an input is $y_i$; $D(\hat{x}_i)$ represents an output of the discriminator network D when an input is $\hat{x}_i$, $\nabla_{\hat{x}_i}D(\hat{x}_i)$ represents a gradient value obtained by derivation of $D(\hat{x}_i)$ with respect to $\hat{x}_i$, and $\lambda$ represents a penalty factor, and training the weight of the discriminator network D using a gradient descent algorithm to complete the training of the discriminator network D for one time;

(3.2) obtaining a newest weight of the discriminator network D to participate in the training of the generator network G, after training the discriminator network D for $n_d$ times, wherein a loss function $L_G$ of the generator network G is:

$$L_G = -\frac{1}{m}\sum_{i=1}^{m}(D(G(s_i))); \quad (4)$$

and training the weight of the generator network G using a gradient descent algorithm;

(3.3) copying the weight of the generator network G to the network $\hat{G}$ to update the weight of the network G, every C times the training step (3.1) and (3.2) are performed; and (4) completing the training of the discriminator network D and the generator network G after executing the step (3) for $N_{train}$ times, wherein the radio resource manager is configured to input a current network state into the generator network G, the generator network G is configured to output the sampling values of the cumulative return distribution corresponding to each resource allocation strategy, a mean value of the sampling values of the return of each resource allocation strategy is calculated, and an action corresponding to a maximum mean value is taken as a resource allocation strategy of the radio resource manager; and (5) allocating the wireless network resource according to the resource allocation strategy corresponding to the maximum mean value determined in step (4).

2. The wireless network resource allocating method based on generative adversarial reinforcement learning according to claim 1, wherein the discount factor $\gamma$ is in the range of 0.75 to 0.9.

3. The wireless network resource allocating method based on generative adversarial reinforcement learning according to claim 1, wherein N is in the range of 30 to 55.

4. The wireless network resource allocating method based on generative adversarial reinforcement learning according to claim 1, wherein $\epsilon$ has an initial value of 0.9, and is reduced by 0.05 every 100 times the step (2) is performed and remains unchanged until $\epsilon$ reaches 0.05; and $\xi$ is in the range of 0.8 to 1.5.

5. The wireless network resource allocating method based on generative adversarial reinforcement learning according to claim 1, wherein the magnitude $N_B$ of the buffer area $\mathcal{B}$ is in the range of 3000 to 10000.

6. The wireless network resource allocating method based on generative adversarial reinforcement learning according to claim 1, wherein $n_d$ is in the range of 1 to 10; and the number m of the quadruplets is 32 or 64.

7. The wireless network resource allocating method based on generative adversarial reinforcement learning according to claim 1, wherein the penalty factor $\lambda$ is 10, 20 or 30.

8. The wireless network resource allocating method based on generative adversarial reinforcement learning according to claim 1, wherein the gradient descent algorithm for training both the generator network G and the discriminator network D is Adam with a learning rate of 0.001.

9. The wireless network resource allocating method based on generative adversarial reinforcement learning according to claim 1, wherein K is in the range of 10 to 50.

10. The wireless network resource allocating method based on generative adversarial reinforcement learning according to claim 1, wherein $N_{train}$ is in the range of 2000 to 3000.

11. A wireless network resource allocating device, comprising:

a processor; and a memory for storing instructions executable by the processor, wherein the processor is configured to execute the instructions in the memory to implement steps of the wireless network resource allocating method according to claim 1.

12. The wireless network resource allocating device according to claim 11, wherein the discount factor $\gamma$ is in the range of 0.75 to 0.9.

13. The wireless network resource allocating device according to claim 11, wherein N is in the range of 30 to 55.

14. The wireless network resource allocating device according to claim 11, wherein $\epsilon$ has an initial value of 0.9, and is reduced by 0.05 every 100 times the step (2) is performed and remains unchanged until $\epsilon$ reaches 0.05; and $\xi$ is in the range of 0.8 to 1.5.

15. The wireless network resource allocating device according to claim 11, wherein the magnitude $N_B$ of the buffer area $\mathcal{B}$ is in the range of 3000 to 10000; and the penalty factor $\lambda$ is 10, 20 or 30.

16. The wireless network resource allocating device according to claim 11, wherein $n_d$ is in the range of 1 to 10; and the number m of the quadruplets is 32 or 64.

17. The wireless network resource allocating device according to claim 11, wherein the gradient descent algorithm for training both the generator network G and the discriminator network D is Adam with a learning rate of 0.001.

18. The wireless network resource allocating device according to claim 11, wherein K is in the range of 10 to 50, and $N_{train}$ is in the range of 2000 to 3000.

19. A non-transitory computer-readable storage medium having stored therein executable instructions that, when executed by a processor, causes steps of the wireless network resource allocating method according to claim 1 to be implemented.

20. A wireless network resource allocating system, comprising:
   a base station; and
   a wireless network resource allocating device according to claim 11, which is in communication with the base station,
   wherein the base station is configured to transmit a plurality of network resource requests to the wireless network resource allocating device;
   the wireless network resource allocating device is configured to receive the plurality of network resource requests from the base station, execute the wireless network resource allocating method according to the plurality of network resource requests to generate a resource allocation strategy, and transmit the resource allocation strategy to the base station; and
   the base station is further configured to receive the resource allocation strategy from the wireless network resource allocating device, divide the network resource into a plurality of network slices according to the resource allocation strategy, and allocate the plurality of network slices.

* * * * *